United States Patent
Zhang et al.

[11] Patent Number: 6,115,088
[45] Date of Patent: Sep. 5, 2000

[54] DISPLAY DEVICE

[75] Inventors: Hongyong Zhang; Satoshi Teramoto, both of Kanagawa, Japan

[73] Assignee: Semiconductor Energy Laboratory Co., Ltd., Kanagawa-ken, Japan

[21] Appl. No.: 08/922,951

[22] Filed: Sep. 3, 1997

[30] Foreign Application Priority Data

Sep. 3, 1997 [JP] Japan ................................ 8-253817

[51] Int. Cl.[7] ........................ G02F 1/1343; G02F 1/136; G02F 1/1333

[52] U.S. Cl. .................. 349/39; 349/43; 349/111; 349/138

[58] Field of Search .................. 349/38, 39, 111, 349/138, 42, 43; 257/59, 72

[56] References Cited

U.S. PATENT DOCUMENTS

| | | | |
|---|---|---|---|
| 4,598,305 | 7/1986 | Chiang et al. | 357/23 |
| 4,759,610 | 7/1988 | Yanagisawa | 350/334 |
| 5,051,570 | 9/1991 | Tsujikawa et al. | 250/201 |
| 5,162,933 | 11/1992 | Kakuda et al. | 359/59 |
| 5,182,620 | 1/1993 | Shimada et al. | 257/72 |
| 5,185,601 | 2/1993 | Takeda et al. | 340/784 |
| 5,221,365 | 6/1993 | Noguchi et al. | 136/258 |
| 5,254,480 | 10/1993 | Tran | 437/2 |
| 5,273,910 | 12/1993 | Tran et al. | 437/3 |
| 5,289,030 | 2/1994 | Yamazaki et al. | 257/410 |
| 5,313,075 | 5/1994 | Zhang et al. | 257/57 |
| 5,317,433 | 5/1994 | Miyawaki et al. | 359/59 |
| 5,413,958 | 5/1995 | Imahashi et al. | 437/173 |
| 5,459,595 | 10/1995 | Ishiguro et al. | 359/59 |
| 5,459,596 | 10/1995 | Ueda et al. | 359/59 |
| 5,499,123 | 3/1996 | Mikoshiba | 359/59 |
| 5,500,538 | 3/1996 | Yamazaki et al. | 257/49 |
| 5,517,341 | 5/1996 | Kim et al. | 359/59 |
| 5,585,951 | 12/1996 | Noda et al. | 349/122 |
| 5,591,988 | 1/1997 | Arai et al. | 257/59 |
| 5,641,974 | 6/1997 | de Boer et al. | 257/59 |
| 5,694,185 | 12/1997 | Oh | 349/46 |
| 5,777,701 | 7/1998 | Zhang | 349/44 |
| 5,982,460 | 11/1999 | Zhang et al. | 349/39 |

FOREIGN PATENT DOCUMENTS

| | | |
|---|---|---|
| 51-54790 | 5/1976 | Japan. |
| 61-7663 | 1/1986 | Japan. |
| 63-29924 | 2/1988 | Japan. |
| 2-10877 | 2/1990 | Japan. |
| 2-181419 | 7/1990 | Japan. |
| 3-23671 | 1/1991 | Japan. |
| 3-9562 | 1/1991 | Japan. |

*Primary Examiner*—Walter Malinowski
*Attorney, Agent, or Firm*—Fish & Richardson P.C.

[57] ABSTRACT

The present invention provides an active matrix type display device having a high aperture ratio and a required auxiliary capacitor. A source line and a gate line are overlapped with part of a pixel electrode. This overlapped region functions to be a black matrix. Further, an electrode pattern made of the same material as the pixel electrode is disposed to form the auxiliary capacitor by utilizing the pixel electrode. It allows a required value of auxiliary capacitor to be obtained without dropping the aperture ratio. Also, it allows the electrode pattern to function as a electrically shielding film for suppressing the cross-talk between the source and gate lines and the pixel electrode.

43 Claims, 9 Drawing Sheets

DISPLAY DEVICE

BACKGROUND OF THE INVENTION

The invention disclosed in the present specification relates to a structure of a liquid crystal display or a fabrication method thereof.

DESCRIPTION OF RELATED ART

There has been known a flat panel display typified by a liquid crystal display. In a transmission type liquid crystal display having a mode of optically modulating light which has passed through a liquid crystal panel by the liquid crystal panel, light shielding means called a black matrix is required in order to clearly define a profile of pixels. In concrete, it is necessary to cover the peripheral portion of a pixel electrode by a light shielding frame. Such a black matrix plays an important role in displaying fine motion pictures in particular.

However, the black matrix has a demerit that it reduces an effective area of a pixel (this rate will be referred to as an aperture ratio) and darkens the screen.

It is being tried to utilize the flat panel display in low power consumption type portable equipments such as a portable video camera and a portable information terminal in recent years.

What comes into question here is the low power consumption characteristic which is required for such portable equipments. That is, it is necessary to reduce the power consumption used for displaying the screen.

In case of the transmission type liquid crystal display, a method how to reduce power consumed by a back-light for illuminating from the back of the liquid crystal panel comes into question. The power consumption of the back-light may be reduced by reducing brightness of the back-light by increasing the aperture ratio of the pixel.

Meanwhile, in case of the liquid crystal display, it is necessary to dispose a capacitor called an auxiliary capacitor in order to supplement a capacity which liquid crystal has in each pixel. This auxiliary capacitor has a function of holding information (which corresponds to a quantity of charge), which has been written to a pixel electrode and which is rewritten by a predetermined time interval, until it is rewritten in the next time. Flickers or nonuniformity of color (which is actualized specially in displaying in color) occurs in the display when the value of the auxiliary capacitor is small.

However, the provision of the auxiliary capacitor in each pixel also becomes a factor of dropping the aperture ratio of the pixel, similarly to the case of disposing the black matrix.

SUMMARY OF THE INVENTION

As described above, the disposition of the black matrix and the auxiliary capacitor for the purpose of increasing the image quality becomes the factor of dropping the aperture ratio of the pixel. The drop of the aperture ratio invites a drop of the image quality in another sense.

That is, it is contradictory to request a clear image to be displayed (by the effect of the black matrix) and to obtain a bright image (by increasing the aperture ratio).

It is also contradictory to suppress the flickers and nonuniformity of color in the display (by the effect of the auxiliary capacitor) and to obtain a bright image (by increasing the aperture ratio).

Accordingly, it is an object of the invention disclosed in the present specification to provide a technology for solving the above-mentioned contradictory requests.

According to one of the invention disclosed in the present specification, an active matrix type display device comprises an electrode pattern made of a conductive film disposed between source and gate lines and a pixel electrode; and an auxiliary capacitor formed between the electrode pattern and the pixel electrode.

According to another invention, an active matrix type display device comprises an electrode pattern made of a conductive film disposed between source and gate lines and a pixel electrode; an edge of the pixel electrode is disposed so as to overlap with the source and gate lines; and an auxiliary capacitor is formed between the electrode pattern made of the conductive film and the pixel electrode.

In the arrangements of the two inventions described above, the electrode pattern made of the conductive film functions as a shield film for electrically shielding the source and gate lines from the pixel electrode.

A structure of a still other invention is an active matrix type display device in which an electrode pattern made of a conductive film is disposed so as to cover source and gate lines.

In the structure described above, the electrode pattern made of the conductive film overlaps partially with the pixel electrode to form an auxiliary capacitor. Further, the electrode pattern made of the conductive film functions as a shield film for electrically shielding the source and gate lines from the pixel electrode.

One concrete example of the invention disclosed in the present specification is characterized in that an electrode pattern 106 made of the same material as a pixel electrode 107 is disposed between a source line 105 and a gate line 104 and the pixel electrode 107 to form an auxiliary capacitor between the electrode pattern 106 and the pixel electrode 107 as its pixel structure is shown in FIG. 1.

DESCRIPTION OF PREFERRED EMBODIMENTS

[First Embodiment]

Figure 1:
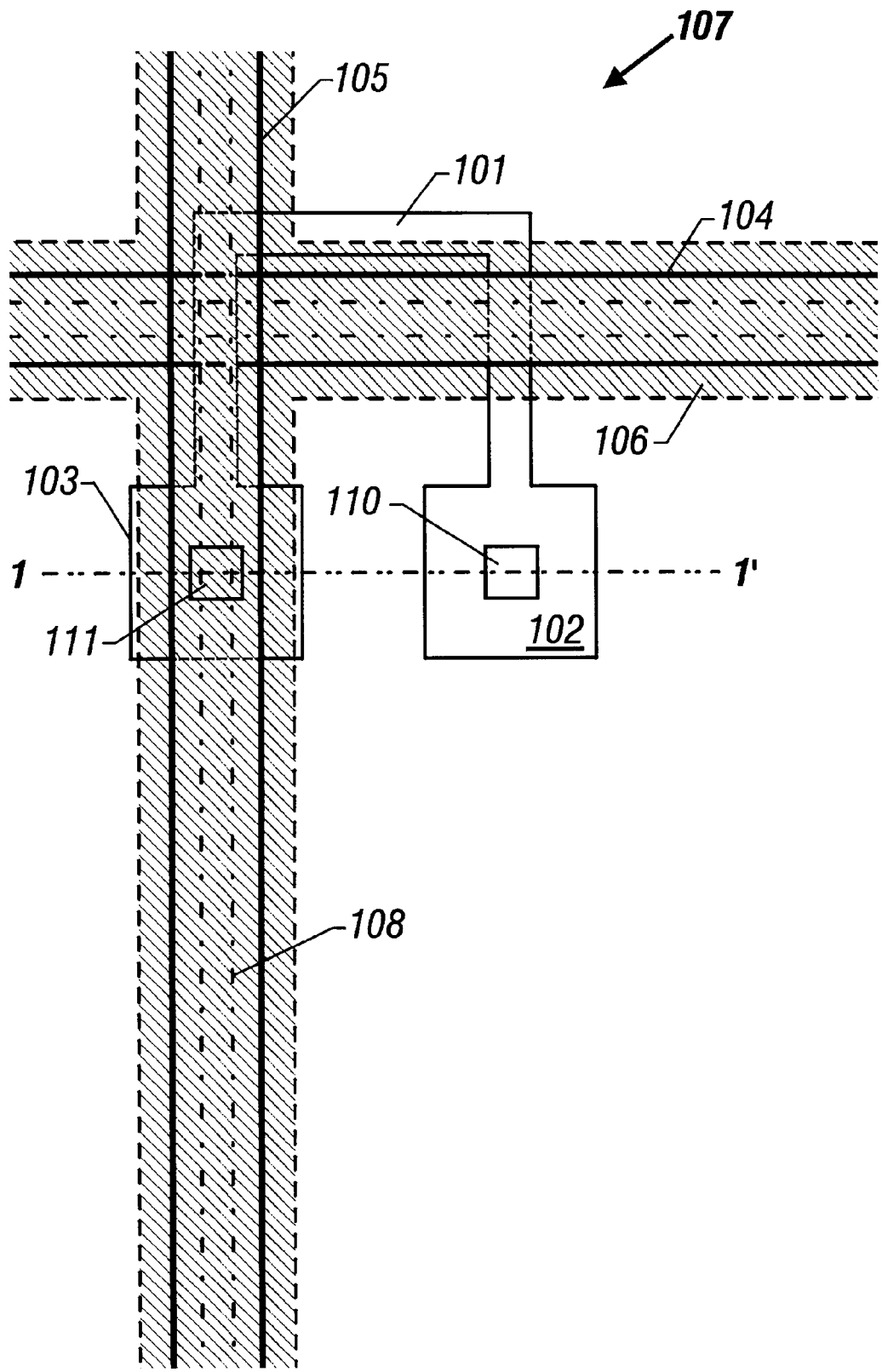
FIG. 1 is a plan view of an active matrix circuit in accordance with the embodiment 1 of the present invention.
Figure 2:
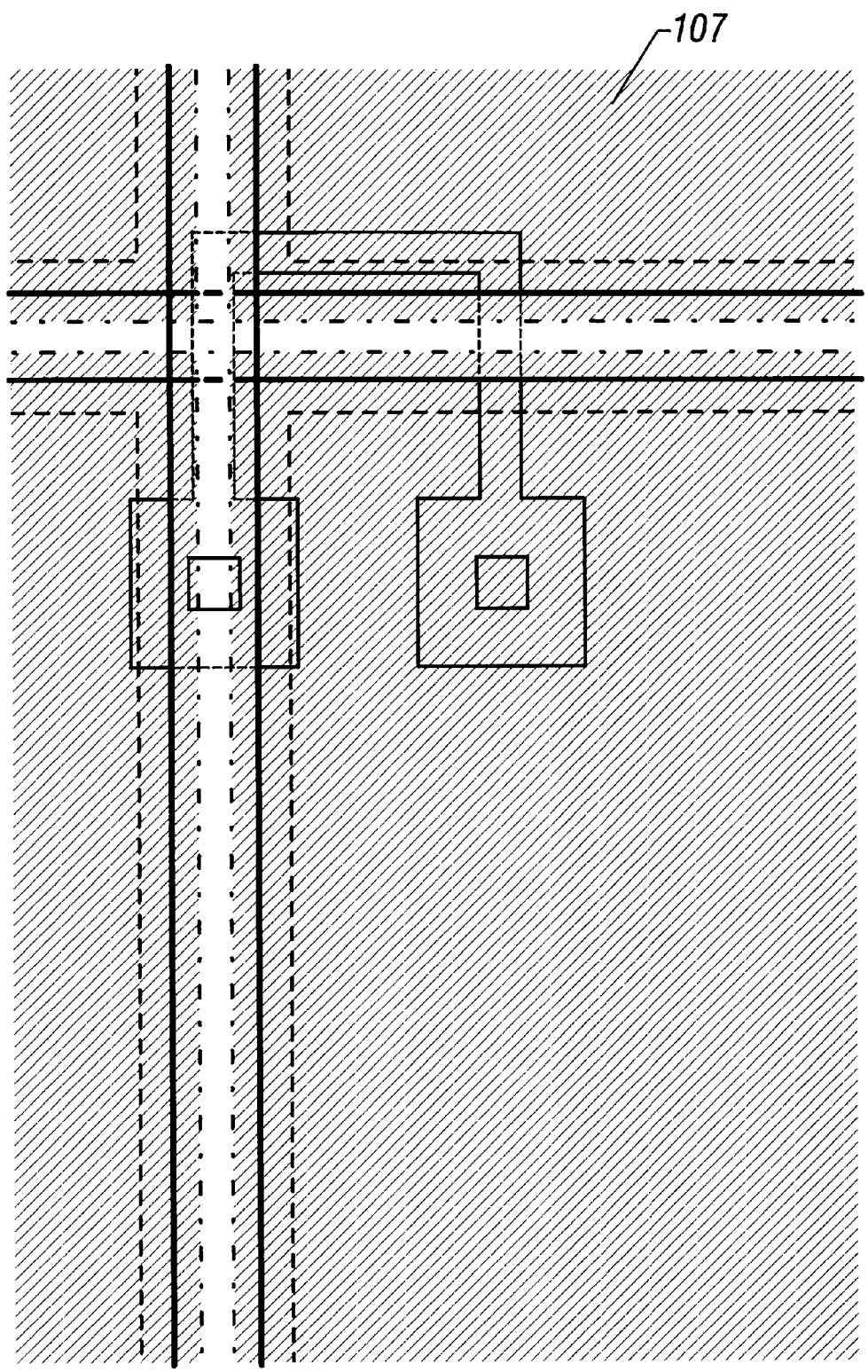
FIG. 2 is a plan view of the active matrix circuit in accordance with the embodiment 1 of the present invention.
Figure 3:
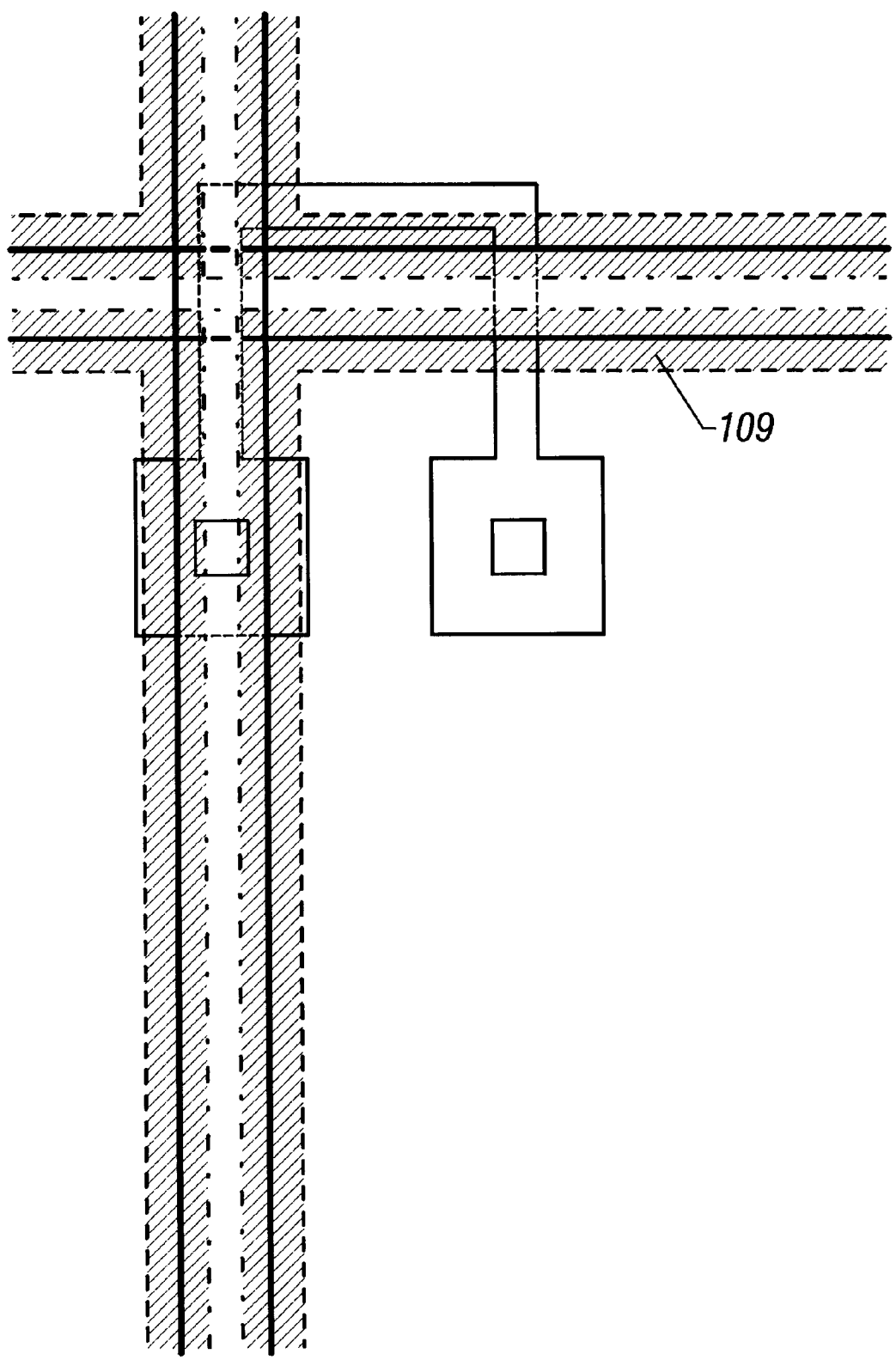
FIG. 3 is a plan view of the active matrix circuit in accordance with the embodiment 1 of the present invention.

FIGS. 1 through 3 show the structure of the present embodiment. FIGS. 1 through 3 are enlarged plan views showing part of one pixel of an active matrix type liquid crystal display.

FIGS. 1 through 3 show the same part. The structure thereof will be explained with reference to FIG. 1 at first. In FIG. 1, a pattern 101 constitutes an active layer of a thin film transistor. The active layer 101 is made of a crystal silicon film.

A reference numeral 102 which is part of the active layer 101 is a region called as a drain region. A reference numeral 103 is a region called as a source region. These regions are N-type in case of N-channel type and are P-type in case of P-channel type.

A pattern 104 is a gate line. Regions in the active layer 101 at the part where the gate line 104 overlaps with the active layer 101 are channel regions. Regions where the gate line 104 overlaps with the active layer 101 function as gate electrodes.

A source line 105 contacts with the source region 103 via a contact 111.

A vertical positional relationship between the active layer 101 and the gate line 104 is as follows. That is, a gate insulating film not shown is formed on the active layer 101 and the gate line 104 is formed thereon.

An interlayer insulating film not shown is formed on the gate line 104 and the source line 105 is formed thereon.

A hatched region 106 is an electrode pattern made of ITO for forming a capacitor. This electrode pattern is latticed when seen from the point of view of the whole active matrix region. The electrode pattern 106 made of ITO for forming the capacitor is constructed so as to be kept at an adequate constant potential (reference potential). In concrete, it is constructed so as to contact with an electrode of a counter substrate (this electrode is connected with a counter electrode) at the edge of an active matrix circuit not shown. Thus, it is arranged so that its potential is kept same with the counter electrode.

The shape of the electrode pattern 106 for forming the auxiliary capacitor is not limited only to that shown in FIG. 1. Because the electrode pattern 106 is made of ITO (or an adequate conductive film), it may be shaped with a large degree of freedom.

The pattern 107, made of ITO, constitutes the pixel electrode. The edge of this pattern 107 is indicated by a broken line 108. That is, the edge of the pixel electrode 107 is what a part thereof overlaps with the source line 105 and the gate line 104.

FIG. 2 is a view in which the pattern of the pixel electrode 107 is highlighted as a hatched part. That is, the region indicated by the slant lines is the pixel electrode 107 in FIG. 2.

The pixel electrode 107 is formed on a second interlayer insulating film (not shown) which is formed on the electrode pattern 106 made of ITO for forming the capacitor.

As shown in FIG. 1, the pixel electrode 107 contacts with the drain region 102 of the active layer pattern 101 via a contact 110.

As it is apparent from FIGS. 1 and 2 (FIG. 2 in particular), the pixel electrode 107 is disposed so that its edge overlaps with the gate line 104 and the source line 105. The region where the pixel electrode 107 overlaps with the gate line 104 and the source line 105 becomes a black matrix which shields light around the edge of the pixel electrode.

The electrode pattern 106 indicated by the slant lines in FIG. 1 for forming the capacitor also overlaps with the pixel electrode 107 indicated by the slant lines in FIG. 2 in the region indicated by a hatched part 109 in FIG. 3.

The auxiliary capacitor is formed in the region where these two ITO electrode patterns overlap. That is, the auxiliary capacitor which is connected in parallel with a capacitor formed between the liquid crystal and the counter electrode is formed.

Figure 4:
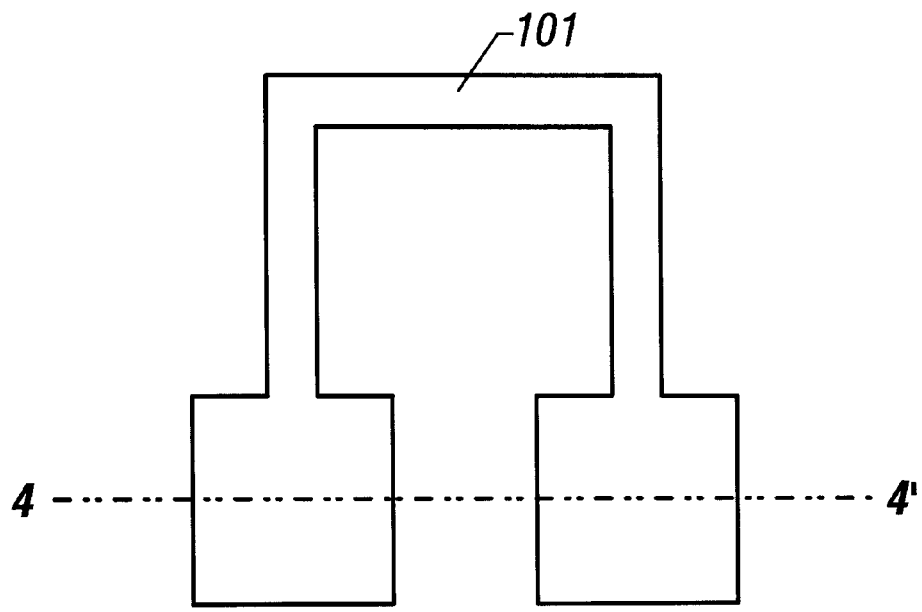
FIG. 4 is a plan view showing a fabrication step of the active matrix circuit in accordance with the embodiment 1 of the present invention.

FIG. 4 and below are section views, along a line 1–1' in FIG. 1, showing fabrication steps thereof. FIGS. 9A–9D and 10 are section views showing corresponding fabrication steps.

Figure 9A:
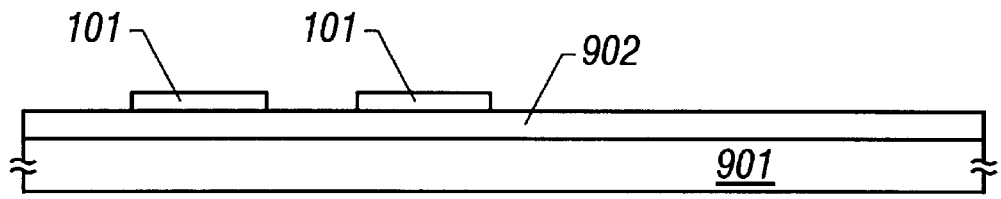
FIGS. 9A through 9D are section views showing a fabrication step of the active matrix circuit in accordance with the embodiment 1 of the present invention.

At first, as shown in FIG. 9A, a silicon oxide film 902 is formed into a thickness of 3000 Å on a glass substrate (or quartz substrate) as an underlayer film by sputtering. It is noted that a section along a line 4–4' in FIG. 4 corresponds to the section in FIG. 9A.

Next, an amorphous silicon film not shown is formed into a thickness of 500 Å by LPCVD. This amorphous silicon film becomes a starting film for forming an active layer of a thin film transistor later.

After forming the amorphous silicon film not shown, laser light is irradiated. By irradiating the laser light, the amorphous silicon film is crystallized and a crystal silicon film is obtained. Also, the amorphous silicon film may be crystallized by heating.

Next, the crystal silicon film thus obtained is patterned to form the active layer 101 whose pattern is shown in FIGS. 4 and 9A. The source/drain region and the channel region are formed within the active layer in the later steps.

Figure 9B:
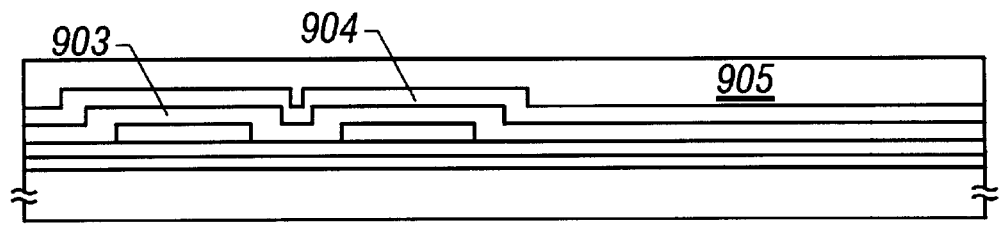

Thus, the state shown in FIGS. 4 and 9A is obtained. Next, a silicon oxide film 903 which functions as a gate insulating film is formed into a thickness of 1000 Å by plasma CVD as shown in FIG. 9B (not shown in FIG. 4).

Figure 5:
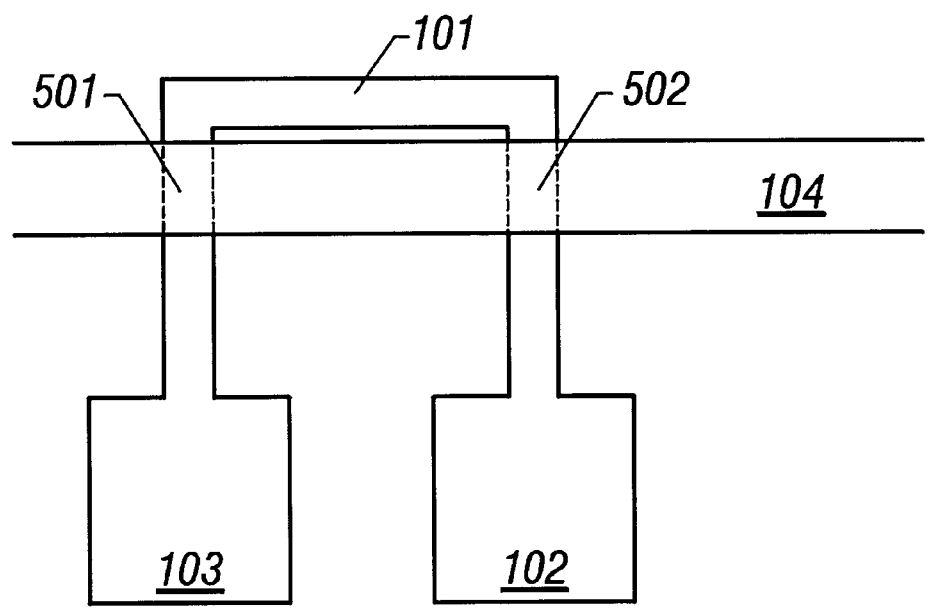
FIG. 5 is a plan view showing a fabrication step of the active matrix circuit in accordance with the embodiment 1 of the present invention.

Next, the gate line 104 is formed as shown in FIG. 5. This gate line 104 is made of aluminum. Further, although not clear from the figures, an anodic oxide film is formed on the surface of the aluminum as a protection film. It is noted that the gate line 104 is not shown in FIG. 9 (that is, no gate line exists on the section face in FIG. 9).

Here, the regions of the active layer where the gate line 104 overlaps with the active layer 101 become channel regions. That is, the regions denoted by the reference numerals 501 and 502 in FIG. 5 are the channel regions. In case of the present embodiment, there exist two channel regions. It is constructed such that two thin film transistors are connected equivalently in series.

Such structure allows the backward leak current and the degree of deterioration to be reduced because voltage applied to one thin film transistor is divided to each transistor part.

After forming the gate line 104, impurity is doped in the state shown in FIG. 5. Here, P (phosphorus) element is doped by plasma doping in order to fabricate an N-channel type thin film transistor.

In the impurity doping step, the gate line 104 becomes a mask and the source region 103 and the drain region 102 are formed in a manner of self-alignment. The positions of two channel regions 501 and 502 are also determined in a manner of self-alignment.

After finishing to dope the impurity, laser light is irradiated to activate the doped element and to anneal damages of the active layer caused during the doping. This activation may be implemented by illuminating by a lamp or by heating.

After forming the gate line 104, a laminate film made of a silicon nitride film 904 and a polyimide film 905 is formed.

This laminate film functions as a first interlayer insulating film. Thus, the state shown in FIG. 9B is obtained.

The utilization of the resin film such as polyimide as the interlayer insulating film allows the surface thereof to be flattened.

Figure 6:
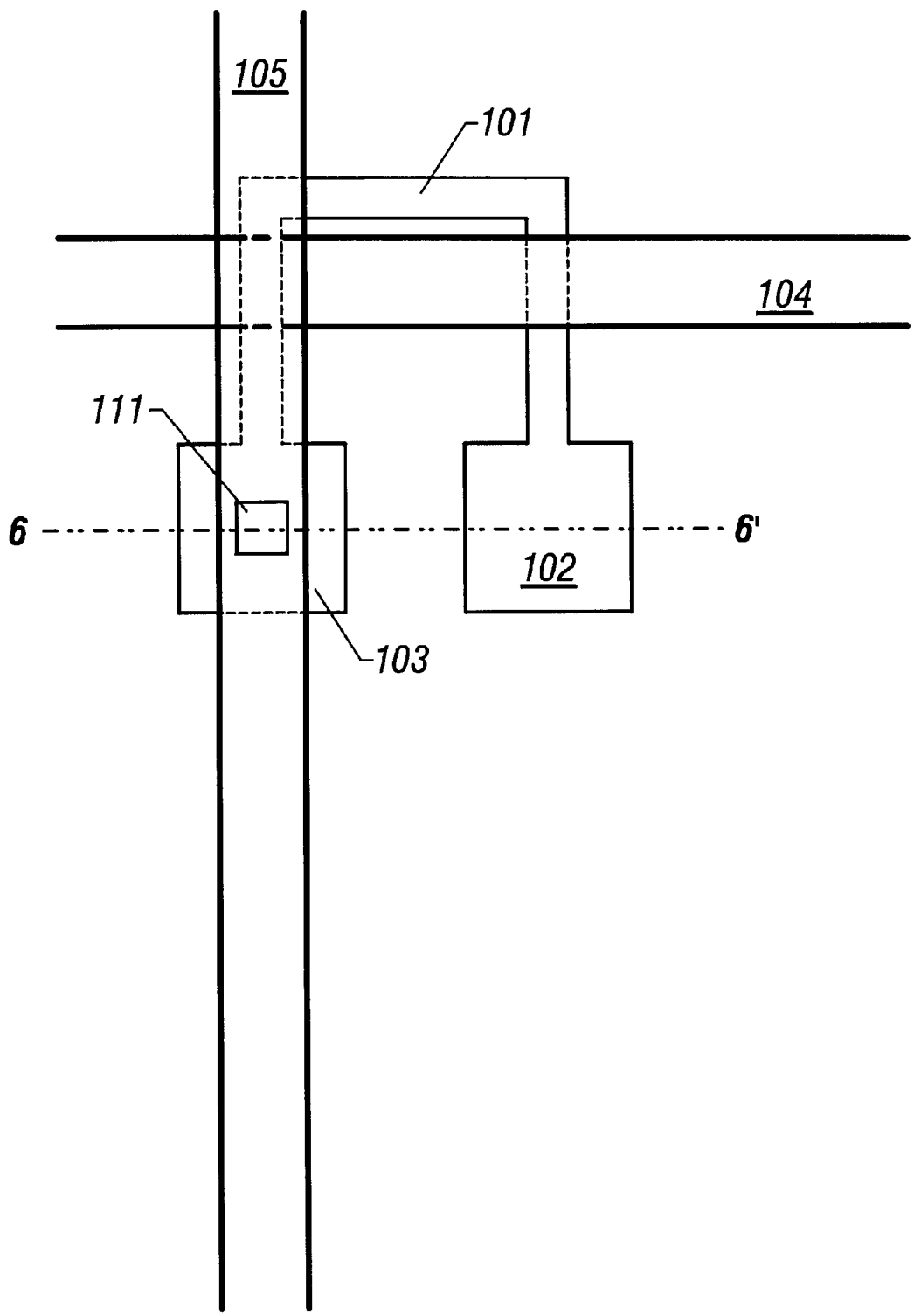
FIG. 6 is a plan view showing a fabrication step of the active matrix circuit in accordance with the embodiment 1 of the present invention.
Figure 9C:
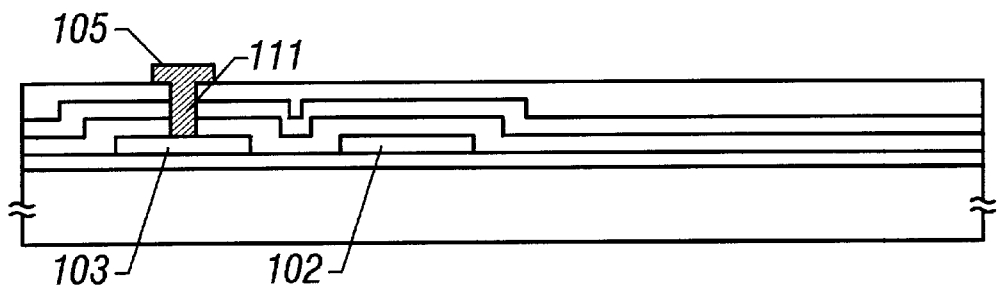

Next, a contact hole 111 is created through the first interlayer insulating film made of the laminate films 904 and 905 as shown in FIG. 9C. Then, the source line 105 is formed as shown in FIGS. 6 and 9C.

The source line 105 is put into a state in which it contacts with the source region 103 via the contact hole 111. It is noted that the section along a line 6–6' in FIG. 6 corresponds to that shown in FIG. 9C.

Figure 7:
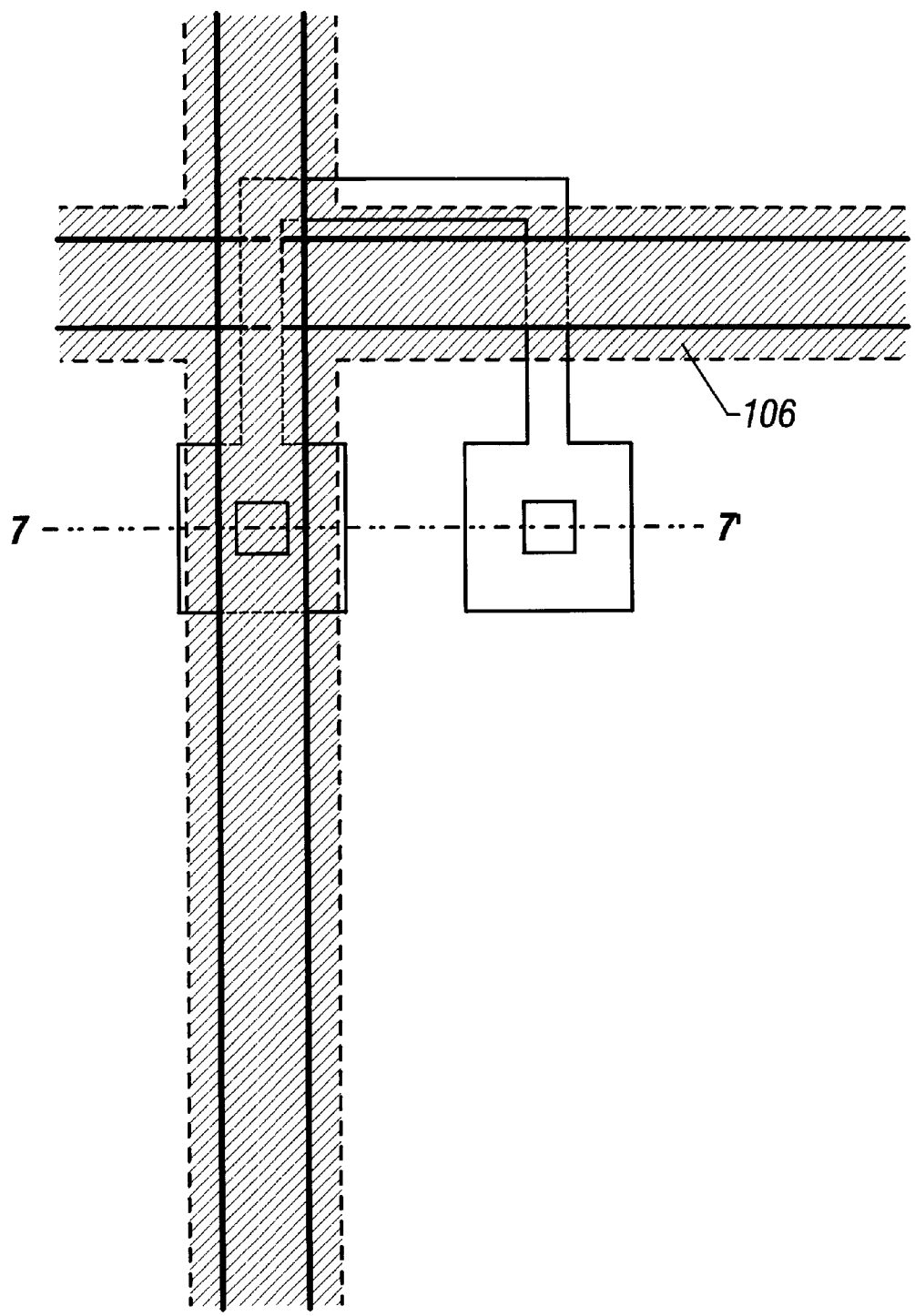
FIG. 7 is a plan view showing a fabrication step of the active matrix circuit in accordance with the embodiment 1 of the present invention.
Figure 9D:
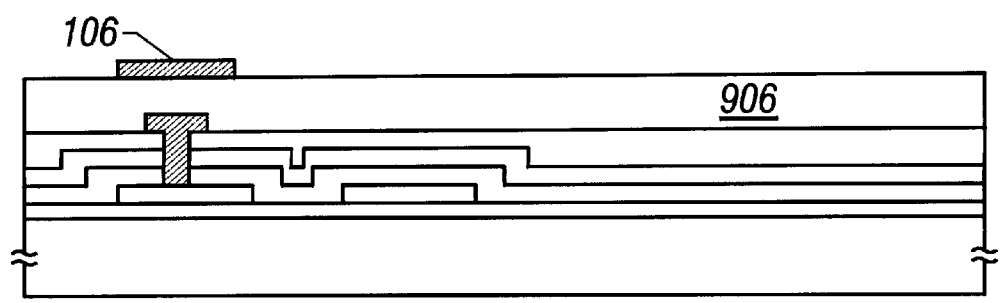

Next, a polyimide film 906 is formed as a second interlayer insulating film as shown in FIGS. 9D and 7.

Further, the pattern 106 made of ITO (for forming the auxiliary capacitor) is formed. Here, the section along a line 7–7' in FIG. 7 corresponds to that shown in FIG. 9D.

Figure 8:
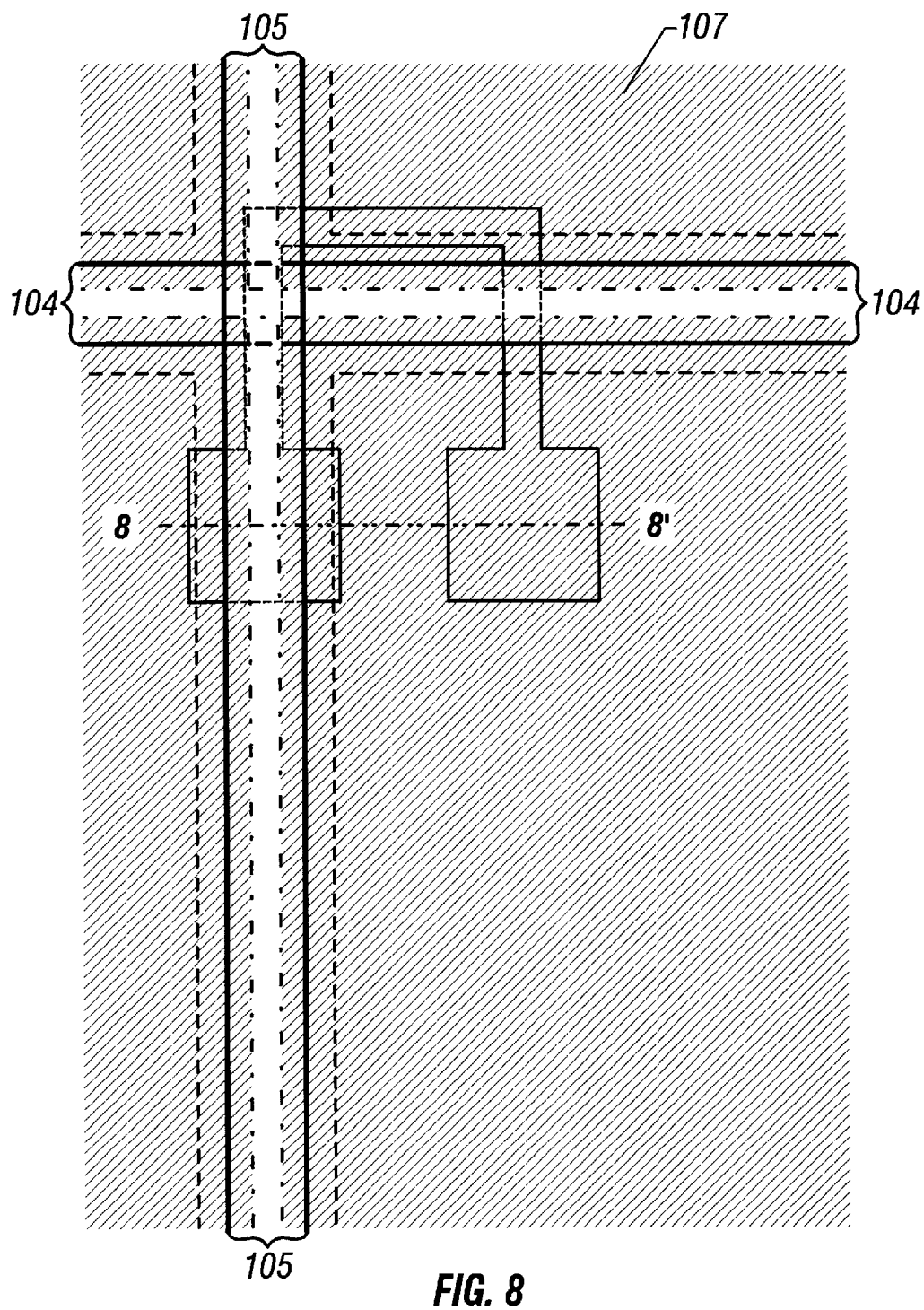
FIG. 8 is a plan view showing a fabrication step of the active matrix circuit in accordance with the embodiment 1 of the present invention.
Figure 10:
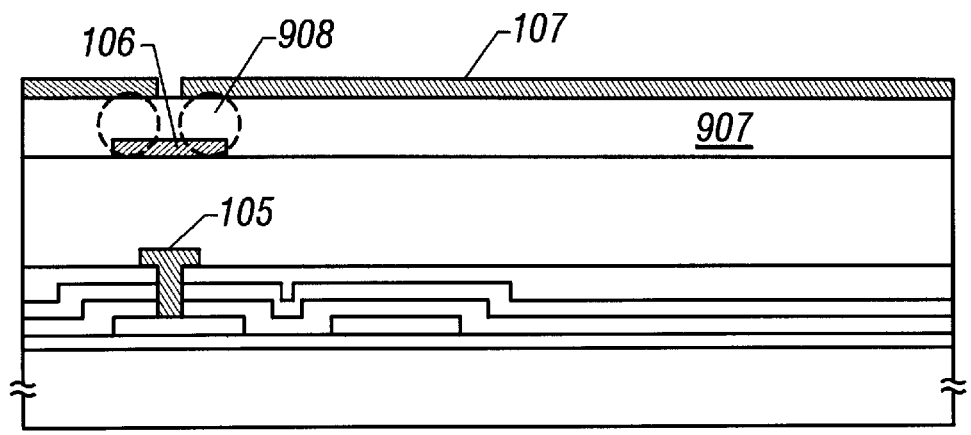
FIG. 10 is a section view showing a fabrication step of the active matrix circuit in accordance with the embodiment 1 of the present invention.

Next, a polyimide film 907 is formed as a third interlayer insulating film as shown in FIGS. 8 and 10. Further, the pixel electrode 107 made of ITO is formed.

Here, the region where the pixel electrode 107 overlaps with the source line 105 (and the gate line) functions as the black matrix as described before. Further, regions 908 where the ITO electrode 106 overlaps with the pixel electrode 107 function the auxiliary capacitor.

Creating the sectional structure as shown in FIG. 10 allows the following significances to be obtained.

(1) By overlapping the edge of the pixel electrode 107 with the source line and the gate line, the overlapped region functions as the black matrix. Thereby, the aperture ratio may be increased to the maximum.

(2) A required capacity may be obtained without dropping the aperture ratio by forming the auxiliary capacitor 908 between the pattern 106 made of ITO 908 and the pixel electrode 107. In particular, the degree of freedom of the ITO pattern to be formed by overlapping with the pixel electrode may be increased to obtain the required capacity.

(3) As it is apparent from FIG. 10, the ITO pattern 106 for forming the auxiliary capacitor is patterned to have an area greater than the source line 105 and is kept at an adequate reference potential. It allows the ITO pattern 106 to function also as a shield film for electrically shielding the pixel electrode 107 from the source line 105. Then, cross-talk between the source line 105 and the pixel electrode 107 may be suppressed. This effect may be obtained in the same manner also between the pixel electrode and the gate line.

[Second Embodiment]

The present embodiment relates to a structure modified from that shown in the first embodiment. The source line and the gate line have been overlapped with the pixel electrode and the overlap regions have been caused to function as the black matrix in the structure shown in the first embodiment. The structure shown in the first embodiment has been useful in increasing the aperture ratio to the maximum. However, it is necessary to increase the area of the black matrix depending on a requested image quality or a displaying method.

Figure 11:
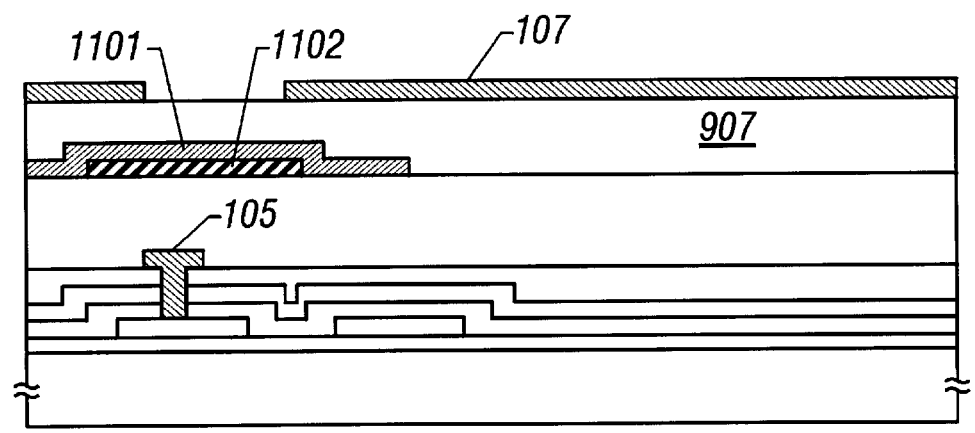
FIG. 11 is a section view showing a fabrication step of the active matrix circuit in accordance with the embodiment 2 of the present invention.

The present embodiment relates to a structure which can be utilized in such a case. FIG. 11 shows a section of a pixel part according to the present embodiment. FIG. 11 corresponds to FIG. 10 and the same reference numerals with those in FIG. 10 denote the same components in FIG. 11.

In the present embodiment, part of a film 1102 which is made of a titanium film or chromium film (or an adequate metallic film) and which constitutes the black matrix overlaps with the edge of the pixel electrode 107 made of ITO.

An ITO pattern 1101 has an area greater than the black matrix 1102 for covering the black matrix 1102 to increase the value of the auxiliary capacitor further. The ITO pattern 1101 for forming the auxiliary capacitor will not drop the aperture ratio even if its area is increased.

The adoption of the invention disclosed in the present specification allows the black matrix to be provided without dropping the aperture ratio of the pixel. Further, it allows the necessary auxiliary capacitor to be provided without dropping the aperture ratio of the pixel. Still more, the cross-talk between the source and gate lines and the pixel electrode may be suppressed by the electrode pattern forming the auxiliary capacitor with the pixel electrode.

While, preferred embodiments have been described, variations thereto will occur to those skilled in the art within the scope of the present inventive concepts.

What is claimed is:

1. An active matrix type display device, comprising:
   a pixel electrode;
   at least one switching element connected to said pixel electrode;
   an electrode pattern made of a transparent conductive film disposed between source and gate lines and said pixel electrode; and
   an auxiliary capacitor formed between said electrode pattern and said pixel electrode,
   wherein said electrode pattern extends over at least a portion of said source line.

2. A device according to claim 1, wherein said electrode pattern made of the transparent conductive film functions as a shield film for electrically shielding said source and gate lines from said pixel electrode.

3. A device according to claim 1, wherein said switching element is a thin film transistor.

4. A device according to claim 1, wherein a material of said electrode pattern is ITO.

5. An active matrix type display device, comprising:
   a pixel electrode;
   at least one switching element connected to said pixel electrode;
   an electrode pattern made of a transparent conductive film disposed between source and gate lines and said pixel electrode;
   an edge of said pixel electrode being disposed so as to overlap with said source and gate lines;
   an auxiliary capacitor formed between said electrode pattern made of said transparent conductive film and said pixel electrode.

6. A device according to claim 5, wherein said electrode pattern made of the transparent conductive film functions as a shield film for electrically shielding said source and gate lines from said pixel electrode.

7. A device according to claim 5, wherein said switching element is a thin film transistor.

8. A device according to claim 5, wherein a material of said electrode pattern is ITO.

9. An active matrix type display device comprising:
   a transparent pixel electrode;
   at least one switching element connected to said transparent pixel electrode; and
   an electrode pattern made of a transparent conductive film disposed between said switching element so as to cover source and gate lines.

10. A device according to claim 9, wherein said electrode pattern made of said transparent conductive film overlaps partially with said pixel electrode to form an auxiliary capacitor.

11. A device according to claim 9, wherein said electrode pattern made of the transparent conductive film functions as a shield film for electrically shielding said source and gate lines from said pixel electrode.

12. A device according to claim 9, wherein said switching element is a thin film transistor.

13. A device according to claim 9, wherein a material of said electrode pattern is ITO.

14. An active matrix type display device comprising: a semiconductor film over a substrate having an insulating surface thereon;
a gate insulating film over said semiconductor film;
a first interlayer insulating film over said gate insulating film;
a wiring formed on said first interlayer film and connected to said semiconductor layer via a contact;
a second interlayer insulating film over said wiring and first interlayer;
an electrode pattern on said second interlayer insulating film so as to cover said wiring;
a third interlayer insulating film over said electrode pattern and said second interlayer insulating film; and
a pixel electrode on said third interlayer insulating film so as to overlap with said electrode pattern,
wherein a material of said electrode pattern is the same as that of the pixel electrode.

15. A device according to claim 14, wherein said material of said electrode pattern is transparent.

16. A device according to claim 14, wherein said first interlayer insulating film is laminate film comprising a silicon nitride film and a polyimide film.

17. A device according to claim 14, wherein said second and third interlayer insulating films comprise polyimide.

18. An active matrix type display device comprising:
a semiconductor film over a substrate having an insulating surface thereon;
a gate insulating film over said semiconductor film;
a first interlayer insulating film over said gate insulating film;
a wiring formed on said first interlayer film and connected to said semiconductor layer via a contact;
a second interlayer insulating film over said wiring and first interlayer;
a black matrix on said second interlayer insulating film so as to cover said wiring;
an electrode pattern on said black matrix and said second interlayer insulating film so as to cover said wiring and said black matrix;
a third interlayer insulating film over said electrode pattern and said second interlayer insulating film; and
a pixel electrode on said third interlayer insulating film so as to overlap with said electrode pattern,
wherein a material of said electrode pattern is the same as that of the pixel electrode.

19. A device according to claim 18, wherein said black matrix comprising a metal selected from titanium and chromium.

20. A device according to claim 18, wherein said material of said electrode pattern and said pixel electrode is transparent.

21. A device according to claim 18, wherein said first interlayer insulating film is laminate film comprising a silicon nitride film and a polyimide film.

22. A device according to claim 18, wherein said second and third interlayer insulating films comprise polyimide.

23. An active matrix type display device comprising:
a semiconductor film over a substrate having an insulating surface;
a gate electrode adjacent to said semiconductor film with a gate insulating film interposed therebetween;
source and drain wirings connected to said semiconductor layer, respectively;
an transparent electrode pattern so as to cover at least a portion of said source wiring;
an insulating film over said transparent electrode pattern; and
a pixel electrode on said interlayer insulating film.

24. A device according to claim 23, wherein said electrode pattern comprises ITO.

25. A device according to claim 23, wherein said source and drain wirings are connected to said semiconductor layer through an insulating film comprising at least silicon and nitrogen.

26. A device according to claim 23, wherein said interlayer insulating film comprises polyimide.

27. An active matrix type display device comprising:
a semiconductor film over a substrate having an insulating surface;
a gate electrode adjacent to said semiconductor film with a gate insulating film interposed therebetween;
an insulating film over said semiconductor film and said gate electrode;
source and drain wirings connected to said semiconductor layer via contact holes in said insulating film;
a black matrix adjacent to at least said source wiring;
an transparent electrode pattern over at least said source wiring;
an interlayer insulating film over said electrode pattern; and
a pixel electrode over said transparent electrode pattern.

28. A device according to claim 27, wherein said black matrix comprises a metal selected from titanium and chromium.

29. A device according to claim 27, wherein said electrode pattern and said pixel electrode comprise ITO.

30. A device according to claim 27, wherein said insulating film comprises at least silicon and nitrogen.

31. A device according to claim 27, wherein said interlayer insulating film comprises polyamide.

32. An active matrix type display device, comprising:
at least one thin film transistor having a U-shaped active layer;
an electrode pattern made of a conductive film disposed between source and gate lines and a pixel electrode; and
an auxiliary capacitor formed between said electrode pattern and said pixel electrode.

33. A device according to claim 32, wherein said electrode pattern made of the conductive film functions as a shield film for electrically shielding said source and gate lines from said pixel electrode.

34. A device according to claim 32, wherein a material of said electrode pattern is the same as that of the pixel electrode.

35. A device according to claim 32, wherein a material of said electrode pattern is transparent.

36. An active matrix type display device, comprising:
at least one thin film transistor having a semiconductor active layer having a plurality of channel regions therein, said thin film transistor connected to a pixel electrode;

source and gate lines connected to said thin film transistor;

an electrode pattern made of a conductive film disposed over at least said source lines;

an auxiliary capacitor formed between said electrode pattern made of said conductive film and said pixel electrode.

37. A device according to claim 36, wherein said electrode pattern made of the conductive film functions as a shield film for electrically shielding said source and gate lines from said pixel electrode.

38. A device according to claim 36, wherein a material of said electrode pattern is the same as that of the pixel electrode.

39. A device according to claim 36, wherein a material of said electrode pattern is transparent.

40. An active matrix type display device comprising:

at least one semiconductor island over a substrate having an insulating surface, said semiconductor island having at least one curved portion;

a gate electrode adjacent to said semiconductor island;

a wiring connected to said semiconductor island;

an insulating film over said wiring;

an electrode pattern covering at least a portion of said wiring;

an interlayer insulating film over said electrode pattern; and a pixel electrode on said interlayer insulating film so as to overlap with at least a portion of said electrode pattern, wherein said semiconductor island has a plurality of channel regions.

41. A device according to claim 40, wherein said electrode pattern and said pixel electrode are transparent.

42. A device according to claim 40, wherein said electrode pattern and said pixel electrode comprise ITO.

43. A device according to claim 40, wherein said interlayer insulating film comprises polyamide.

* * * * *